US008119896B1

(12) United States Patent
Smith

(10) Patent No.: US 8,119,896 B1
(45) Date of Patent: Feb. 21, 2012

(54) MEDIA SYSTEM AND METHOD OF PROGRESSIVE MUSICAL INSTRUCTION

(76) Inventor: L. Gabriel Smith, Nashville, TN (US)

(*) Notice: Subject to any disclaimer, the term of this patent is extended or adjusted under 35 U.S.C. 154(b) by 0 days.

(21) Appl. No.: 12/902,577

(22) Filed: Oct. 12, 2010

Related U.S. Application Data

(60) Provisional application No. 61/360,002, filed on Jun. 30, 2010.

(51) Int. Cl.
*G09B 15/00* (2006.01)
*G09B 15/02* (2006.01)
*G09B 15/04* (2006.01)

(52) U.S. Cl. ........................ 84/470 R; 84/609

(58) Field of Classification Search ................ 84/470 R, 84/609
See application file for complete search history.

(56) References Cited

U.S. PATENT DOCUMENTS

| | | | | |
|---|---|---|---|---|
| 5,533,903 A * | 7/1996 | Kennedy | ................... | 434/307 R |
| 5,585,583 A | 12/1996 | Owen | | |
| 5,690,496 A | 11/1997 | Kennedy | | |
| 6,066,791 A | 5/2000 | Renard et al. | | |
| 6,211,451 B1 * | 4/2001 | Tohgi et al. | ................. | 84/470 R |
| 6,390,923 B1 | 5/2002 | Yoshitomi et al. | | |
| 6,476,304 B2 * | 11/2002 | Uehara | ........................... | 84/600 |
| 6,486,388 B2 | 11/2002 | Akahori | | |
| 6,515,211 B2 * | 2/2003 | Umezawa et al. | .......... | 84/477 R |
| 6,541,692 B2 * | 4/2003 | Miller | ............................ | 84/634 |
| 6,835,887 B2 * | 12/2004 | Devecka | ......................... | 84/743 |
| 6,969,797 B2 | 11/2005 | Brinkman et al. | | |
| 7,030,311 B2 | 4/2006 | Brinkman et al. | | |
| 7,164,076 B2 * | 1/2007 | McHale et al. | ................. | 84/616 |
| 7,174,510 B2 | 2/2007 | Salter | | |
| 7,288,712 B2 | 10/2007 | Uehara | | |
| 7,521,619 B2 * | 4/2009 | Salter | ......................... | 84/477 R |
| 7,758,427 B2 * | 7/2010 | Egozy | ............................. | 463/42 |
| 7,806,759 B2 * | 10/2010 | McHale et al. | ................... | 463/7 |
| 2005/0235812 A1 * | 10/2005 | Fallgatter | ....................... | 84/645 |
| 2007/0256540 A1 | 11/2007 | Salter | | |
| 2007/0256541 A1 * | 11/2007 | McCauley | ...................... | 84/600 |

* cited by examiner

*Primary Examiner* — Jeffrey Donels
(74) *Attorney, Agent, or Firm* — Waddey & Patterson, P.C.; Gary L. Montle

(57) ABSTRACT

A method is provided for progressive musical instruction using a media system with processor-executable software modules storing musical performances each having a plurality of segments. A first set of audiovisual signals is generated to simulate a predetermined musical instrument from a selected performance during host segments. The audiovisual signals are adjusted to mute the predetermined instrument during user segments (non-host segments) of the performance. During the host segments a second set of audiovisual signals is generated for demonstration of a preferred user operation of the instrument. The number of user segments may be maintained or increased for successive iterations of the performance, as the user becomes more proficient. The determination to maintain or increase user segments, and which segments are added to the user segments, may be user selectable or programmable by the system based on various criteria.

18 Claims, 12 Drawing Sheets

MEDIA SYSTEM AND METHOD OF PROGRESSIVE MUSICAL INSTRUCTION

CROSS-REFERENCES TO RELATED APPLICATIONS

This application claims benefit of the following patent application which is hereby incorporated by reference: U.S. Provisional Patent Application Ser. No. 61/360,002, filed Jun. 30, 2010.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to systems and methods of musical instruction. More particularly, the present invention relates to media systems and methods for generating progressive and iterative musical instruction on selected instruments in a predetermined musical performance.

Many present methods of musical instruction have a number of inherent disadvantages, particularly for users who have little experience reading music or those of a young age who are more familiar with the interface and generally the pacing of modern technology and gaming systems. Musical instruction can be difficult and presents a high learning curve. Where the format is not sufficiently enjoyable or requires an inordinate amount of effort before positive feedback is acquired, the user may become discouraged from continuing to practice and acquire proper techniques.

BRIEF SUMMARY OF THE INVENTION

A progressive musical instruction method is provided in accordance various embodiments of the present invention, whereby a user learns to play a musical instrument by playing a gradually increasing number of segments (e.g., notes or chords) within a musical performance, while a media system or gaming system as disclosed herein plays the remaining segments.

In an aspect of the system and method, a user may be presented with increasingly difficult levels rather than being forced to learn all of the notes or chords of a song before playing it all the way through.

In certain embodiments the method may include animated musical notation, wherein graphical representations of the playing area for the musical instrument being learned appear rhythmically and corresponding to the music to be played. Using the example of a guitar, a series of diagrams may be used to present the note or chord to be played as a fret board with graphical indications of which strings are to be pressed, and on which frets, in order to properly play the desired note or chord. The system and method may further indicate to the user which notes or chords are about to be played.

In an embodiment, a system for progressive musical instruction includes a processor-readable memory medium having software residing thereon. The software is executable by a processor to direct the performance of various program steps associated with the musical instruction. Audio signals may be generated corresponding to a predetermined musical performance, with the audio signals in a first operating mode including prerecorded sounds from each of one or more musical instruments associated with the musical performance, and the audio signals in a second operating mode including sounds from said instruments with the exception of a predetermined musical instrument. Display signals may be generated corresponding to the musical performance, with the display signals arranged to provide musical instruction to a user relating to playing of the predetermined musical instrument during at least the second operating mode. During successive iterations of the musical performance, a duration of the second mode may be incremented and a duration of the first mode may be incremented accordingly.

In another embodiment, a system for progressive musical instruction includes a display device, a processor operatively coupled to the display device and a processor-readable memory medium having program modules embodied thereon and executable by the processor. A storage module is effective to store one or more musical performances, each further including a plurality of musical segments. An audio control module is effective to generate sounds in accordance with a selected musical performance, the generated sounds in a first mode corresponding to those produced by each musical instrument associated with the performance, the generated sounds in a second mode corresponding to the associated instruments except for a predetermined musical instrument. A display control module is effective to generate upon the display device a visual representation of the predetermined instrument and graphically populate the visual representation with instruction tools associated with the instrument and in accordance with the musical performance. A mode control module is effective to determine the number of segments in the selected performance to be associated with each mode based upon one or more criteria.

In another embodiment, a method is provided for progressive musical instruction using a media system with processor-executable software modules storing musical performances each having a plurality of segments. A first set of audiovisual signals is generated to simulate a predetermined musical instrument from a selected performance during host segments. The audiovisual signals are adjusted to mute the predetermined instrument during user segments (non-host segments) of the performance. During the host segments a second set of audiovisual signals is generated for demonstration of a preferred user operation of the instrument. The number of user segments may be maintained or increased for successive iterations of the performance, as the user becomes more proficient. The determination to maintain or increase user segments, and which segments are added to the user segments, may be user selectable or programmable by the system based on various criteria.

DETAILED DESCRIPTION OF THE INVENTION

Figure 1:
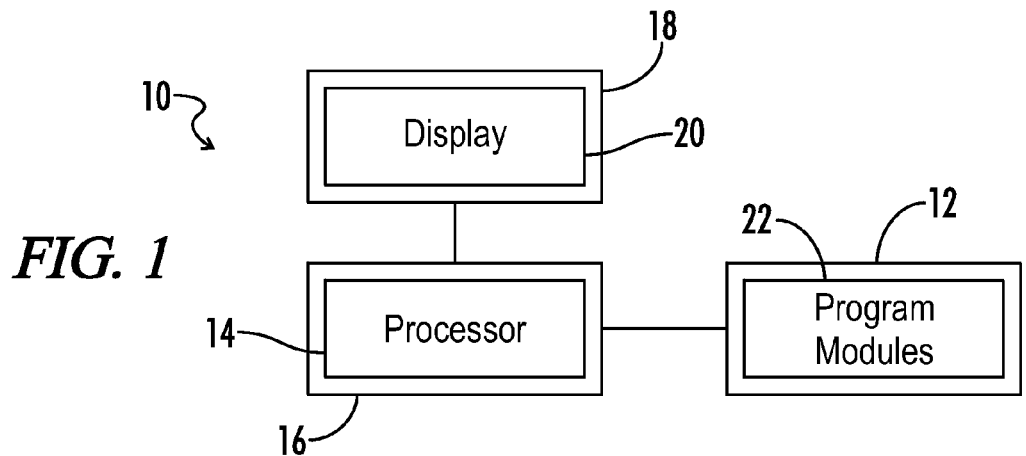
FIG. 1 is a block diagram showing an embodiment of a media system as disclosed herein.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "data storage media" and "processor-readable memory media" as used interchangeably herein, and having processor-executable software, instructions or program modules for implementing subject matter as further defined herein, may refer in an equivalent manner to volatile and non-volatile, removable and non-removable media including at least application specific integrated circuits (ASIC), chip memory devices, disk memory devices, flash memory devices, or any other medium which may be used to stored data in a processor-accessible manner, and may unless otherwise stated either reside on a single computing platform or be distributed across a plurality of such platforms.

The term "processor" as used herein may refer to at least general-purpose or specific-purpose processing devices and/or logic as may be understood by one of skill in the art, including but not limited to central processors, parent processors, graphical processors, media processors, and the like.

Referring generally to FIGS. 1-15, various embodiments of a media system and method for progressive musical instruction may be further described herein. Briefly stated, a media system in accordance with the present disclosure instructs a user with regards to one or more portions of a predetermined musical performance, and plays the remaining portions of the performance. The portions of the performance which are required of the user may be increased in length for example with successive iterations of the performance, or in accordance with successive proficiency levels. The user may be instructed with regards to a single predetermined musical instrument, or one of various instruments associated with a predetermined musical performance and selected by the user, including but not limited to a guitar, bass guitar, keyboard, piano, etc.

Where the various figures may describe embodiments sharing various common elements and features with other embodiments, similar elements and features are given the same reference numerals and redundant description thereof may be omitted below.

Referring first to FIGS. 1-4, various embodiments of media systems 10 as disclosed herein include a processor-readable memory medium 12 or various memory media 12 having a computer program module 22 with processor readable instructions embodied therein. The memory medium 12 may generally be effective to store data accessible to a processor 14 to which the memory medium 12 may be operatively linked. The program module 22 may in various embodiments include or otherwise be defined as any number of combinations of processor-readable instruction modules (defined in FIG. 5 without limitation as a data storage module 22a, an audio control module 22b, a user data receiving module 22c, a mode control module 22d, a display control module 22e, and a user proficiency sensing module 22f) which perform the functions, and a person having ordinary skill in the art of software programming would conceive of numerous structural means for producing the same executable results. When the memory medium 12 is operatively coupled to a processor 14 the instructions may be executed by the processor 14 to perform various functions as further recited herein.

In an embodiment as shown in FIG. 1, a media system 10 includes the memory medium 12 in a modular form which may for example be portable or otherwise removable for operative coupling to various computing or gaming devices 16 having a processor 14 effective to execute the instructions 22. A display device 18 having a display monitor 20 may further be coupled to the media system 10 in the embodiment shown, or alternatively a single gaming device 16 may include both of the processor 14 and display monitor 20 within a common housing.

Figure 2:
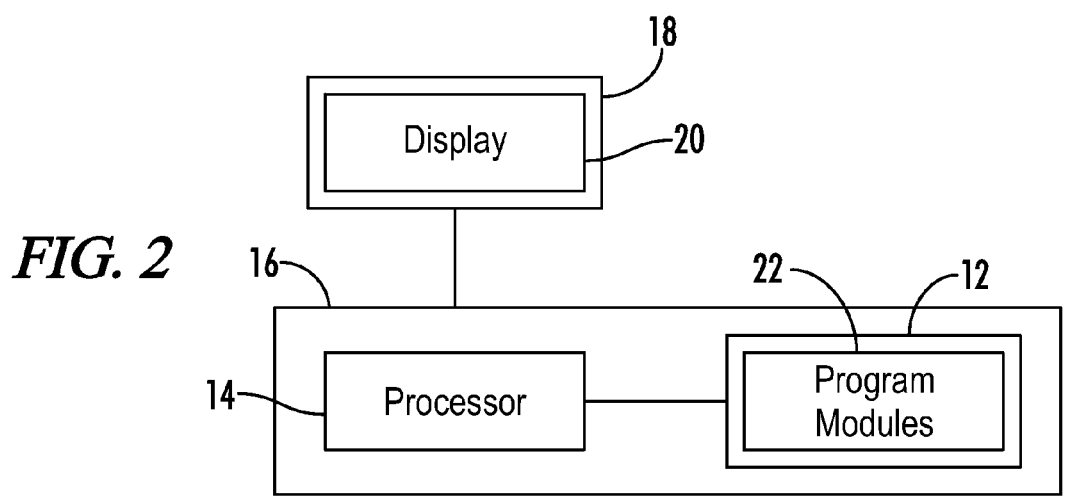
FIG. 2 is a block diagram showing another embodiment of a media system as disclosed herein.

In an embodiment as shown in FIG. 2, a media system 10 includes a common housing 16 for each of the processor 14 and the memory medium 12. The system 10 may be portable or otherwise removable for coupling to various display devices 18 having a display monitor 20 compatible with the media system 10 output signals.

Figure 3:
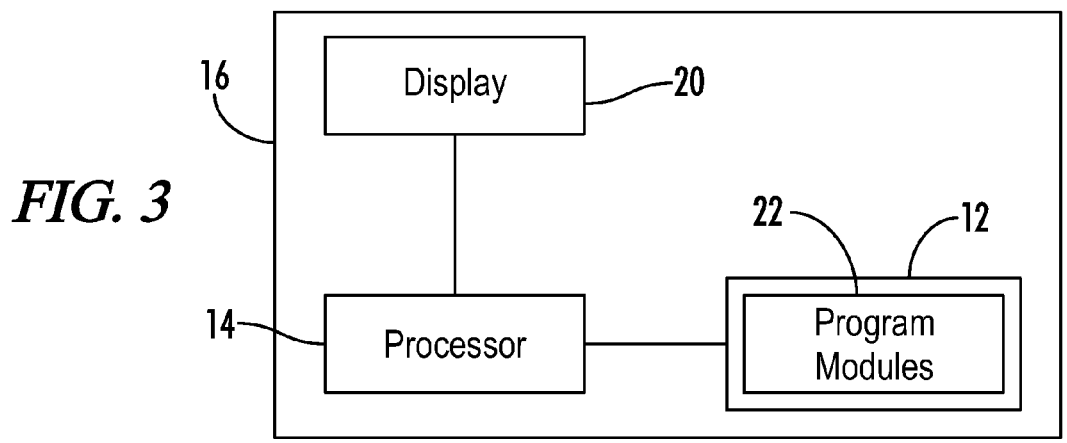
FIG. 3 is a block diagram showing another embodiment of a media system as disclosed herein.

In an embodiment as shown in FIG. 3, a media system 10 includes each of the memory medium 12, the processor 14 and the display monitor 20 in a common housing 16 such as for example a portable internet device having sufficient computing power and display resolution to be compatible with the functions of the system 10.

Figure 4:
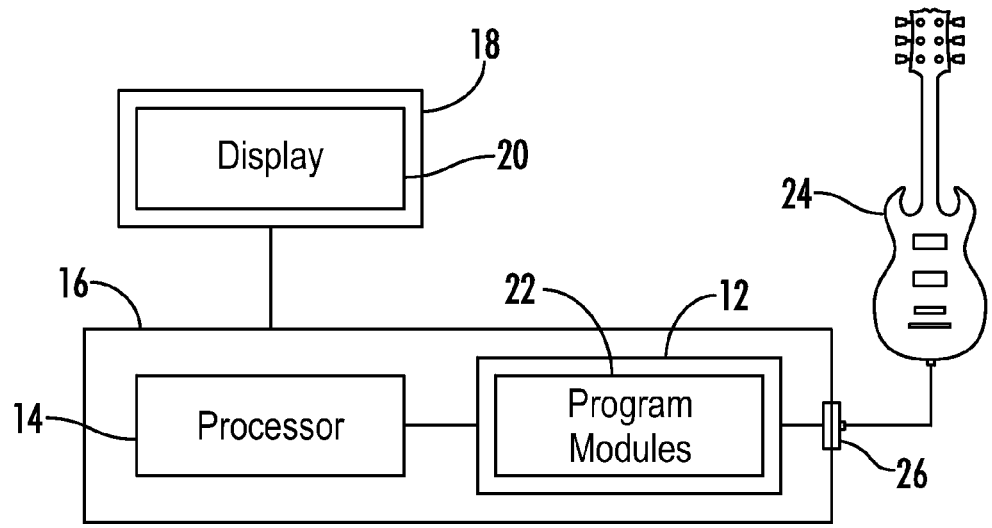
FIG. 4 is a block diagram showing another embodiment of a media system as disclosed herein.

In an embodiment as shown in FIG. 4, a media system 10 further includes an input connector 26 which in combination with software (e.g., a user data input module 22c) may be arranged to receive signals from a musical instrument 24 to be played by a user. The received signals may be processed using software (e.g., a user proficiency sensing module 22f) by the system 10 in comparison with expected signals for corresponding segments of previous iterations of the musical performance for determining user proficiency. Circuitry and software for such signal reception and processing is presently known to those of skill in the art, and as particular structure for performing the same is not required for the media system 10 of the present invention further description herein may be omitted.

Figure 5:
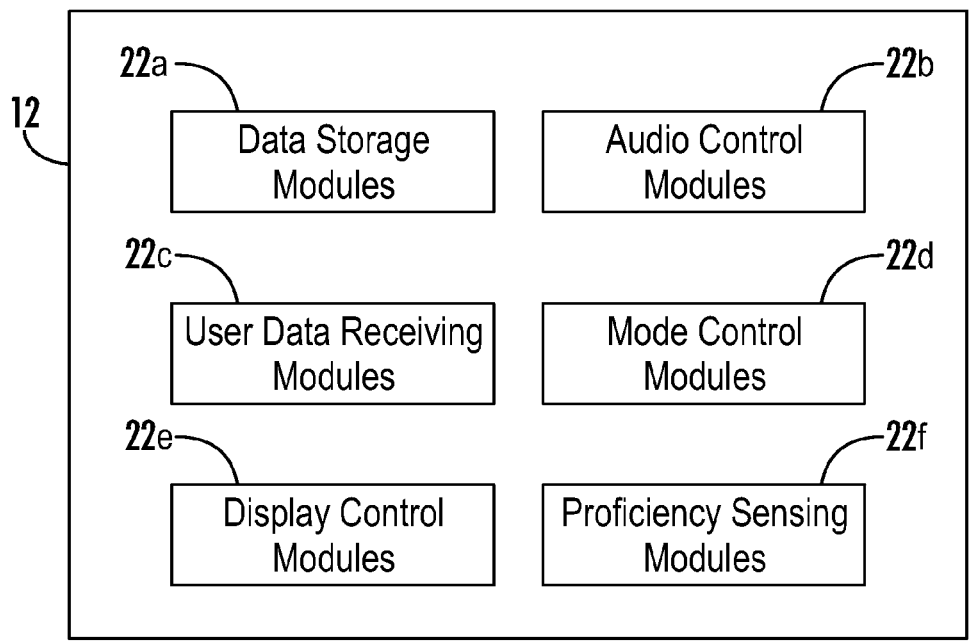
FIG. 5 is a block diagram showing an embodiment of various program modules residing in a processor-readable memory medium as disclosed herein.
Figure 6A:
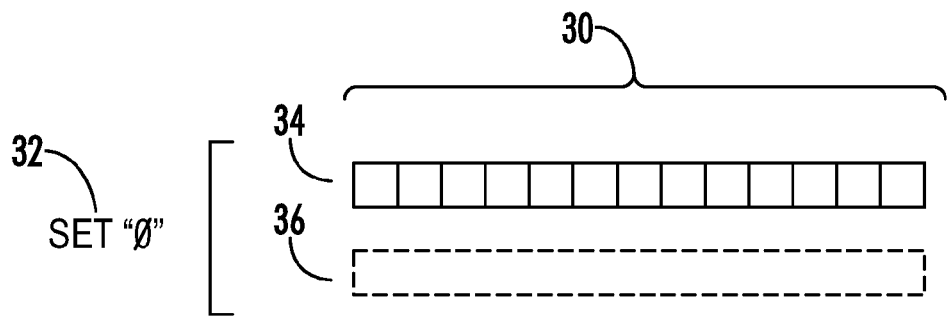
FIGS. 6a-6d are graphical representations showing various sets and operating modes associated with a predetermined musical performance in accordance with various embodiments of a media system as disclosed herein.
Figure 6B:
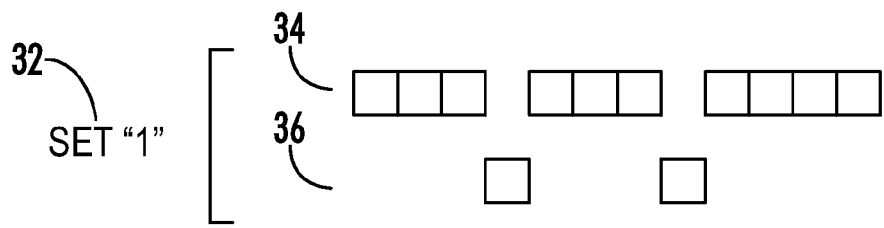
Figure 6C:
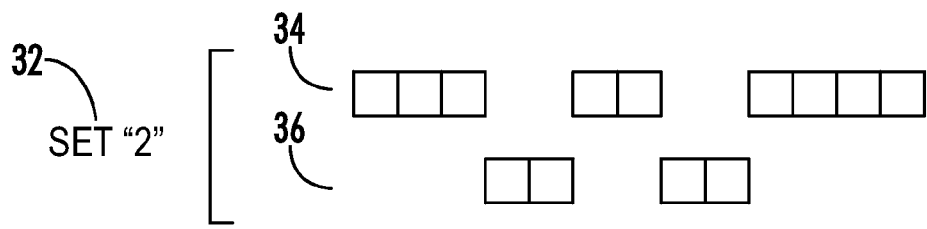
Figure 6D:
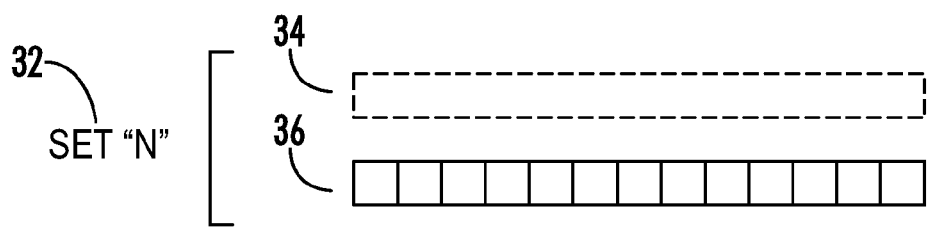

Referring to FIGS. 6a-6d, the memory medium 12 of the system 10 may include a processor-accessible database (such as for example but without limitation using a data storage program module 22a as shown in FIG. 5) upon which one or more musical performances 28 or songs 28 may be stored. In various embodiments each musical performance 28 may be broken up into a plurality of segments 30, each segment 30 including a portion of the musical performance such as a series of notes, chords and the like. Certain of the segments 30 may be defined as host segments 34 and the remainder of the segments defined as user segments 36, wherein a particular set 32 of host and user segments 34, 36 may be defined with respect to all segments 30 in a given performance 28. In set "0" as shown in FIG. 6a, all of the segments 30 are initially defined as host segments 34, such that the entire song would be played by the media system 10 (or "host" system 10) using this set 32. In sets "1," "2," "n" as shown in FIGS. 6b, 6c, 6d, respectively, segments 30 are added incrementally to the row of user segments 36 until in set "n" all of the segments 30 are now user segments 36 and the entire song would be played by the user when this set is utilized.

In an embodiment, a plurality of sets 32 may be stored in the system 10 with respect to the musical performance 28. The plurality of sets 32 may include a single set 32 with regards to each of a plurality of musical instruments associated with the performance 28, a plurality of sets 32 with regards to a single musical instrument associated with the performance 28, or a plurality of sets 32 with regards to each of a plurality of instruments associated with the performance 28.

It may generally be understood that the segments may not be equivalent from instrument to instrument, and may not be of equivalent lengths within a set for the same instrument.

An initial set 32 for use in a particular session may be made selectable by a user, may be predetermined as stored within the system 10, or alternatively may be determined by the system 10 in accordance with various criteria. Examples of the criteria to be used may include any or all of the following without limitation: the difficulty of the segments, the proficiency level of the user (as selected by the user or as determined by the system), the type of musical instrument and the distinctiveness of the segments. For example, the user segments in an initial set or iteration to be played would generally be determined with respect to a relatively low difficulty level and gradually increased in successive sets or iterations. This determination may likely vary according to the instrument, as for example a portion of a song having a difficult guitar riff may not necessarily equate to a portion of the song which would be particularly difficult for other instruments. Further, even where a particular segment of the song is of somewhat increased difficulty, it may be desirable to play such a segment first where the segment in question includes the most distinctive notes or chords from the song, and would be of greater interest to the user. For example, the user may more inherently recognize certain segments in relation to other segments even where the underlying skill level required may be greater.

Figure 7:
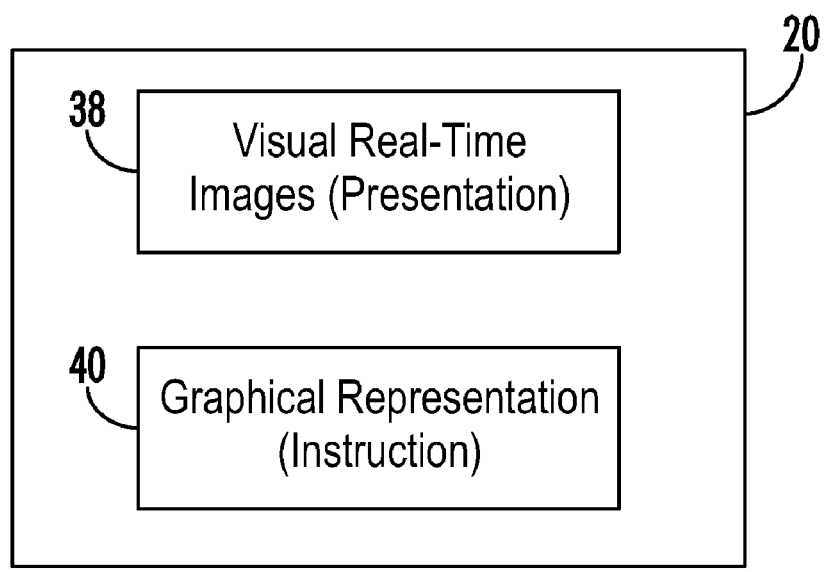
FIG. 7 is a block diagram showing display portions of a display device in accordance with various embodiments of a media system as disclosed herein.

Referring now to FIG. 7, in various embodiments the system 10 may generate display signals to a display monitor 20 or screen 20 such as for example an LCD for producing one or more real-time images 38 of the predetermined musical instrument being played and/or visual representations 40 of the instrument graphically populated with accompanying tools for musical instruction in accordance with the musical performance.

An example of such an embodiment with respect to a guitar as the instrument, and a method of instruction associated with the embodiment, may be described further with reference to FIGS. 8-14. A first image 38a is displayed of the right hand of a guitar player demonstrating a proper method of musical performance (e.g., picking of the guitar strings. A second image 38b is displayed of the left hand of a guitar player demonstrating a proper method of musical performance (e.g., selection of chords and notes). A graphical representation 40 of the proper notes and chords to be played is further provided with respect to images provided on a guitar fret board.

In the embodiment shown, the graphical representation 40 embodies a method of animated musical notation using fret boards 42 that appear sequentially and correspond rhythmically with the music to be played. The animation may in various embodiments appear in any moving visual format as would be known by those of skill in the art, including video and software applications.

The series of fret board diagrams or images 42 each present the notes or chords to be played as a fret board 42 with graphical indications of which strings are to be pressed, and on which frets, in order to properly play the desired note or chord. The series of fret board diagrams 42 may move for example down the screen 20 and from rear to front in rhythm with the musical performance 28. The user is thereby instructed to play each note or chord indicated on the fret board diagrams or images 42 as they pass into a highlighted region 44 on the screen 20. The highlighted region 44 may be for example a front-most portion 44 of the screen 20 where the diagram 42 within the portion 44 lights up, expands in size, changes color, or otherwise is provided with a visual indicator such as text or an equivalent icon. The system 10 accordingly facilitates the user being able to identify notes and chords that are about to be played by providing the series of fret board diagrams or images 42 that are not yet in the highlighted region 44 but are moving rhythmically in that direction.

Figure 8:
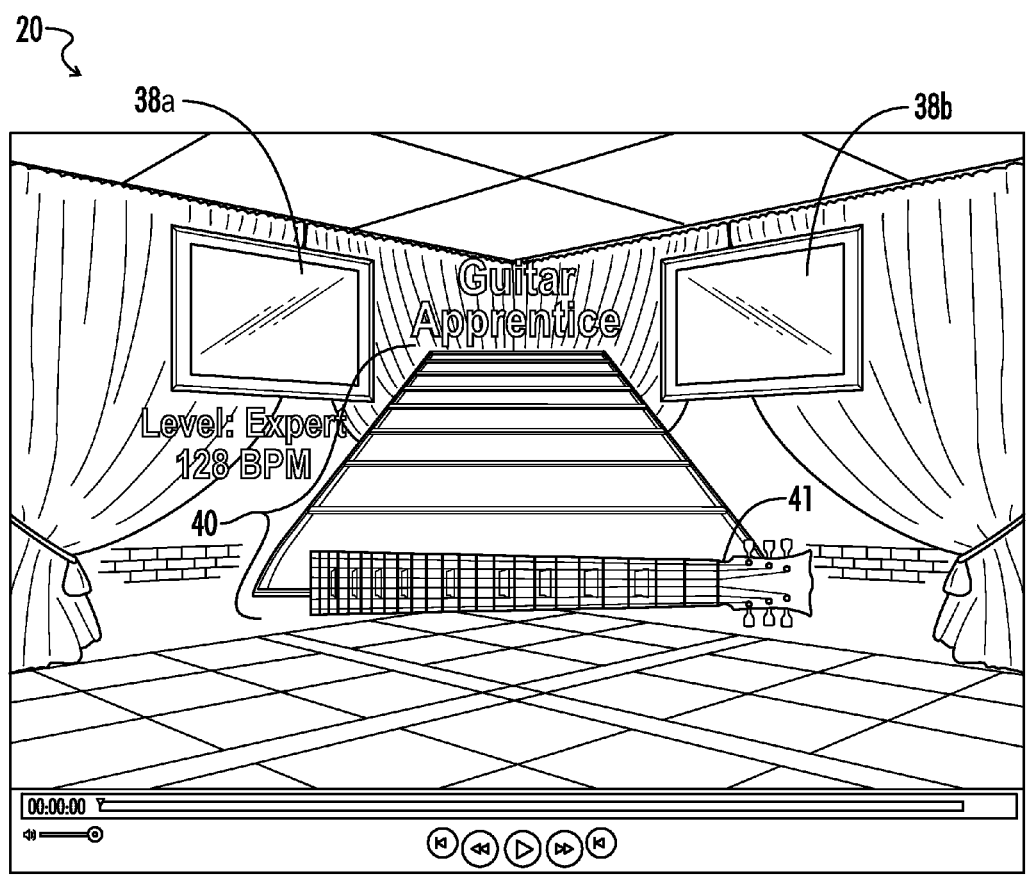
FIGS. 8-14 are modified screen shots showing images generated on a display monitor in accordance with an embodiment of a media system and method as disclosed herein.

Referring first to FIG. 8, the screen 20 displays first and second real-time images 38a, 38b, and a stationary neck 41 in initial and predetermined positions prior to the beginning of a musical performance, with no corresponding musical instruction.

Figure 9:
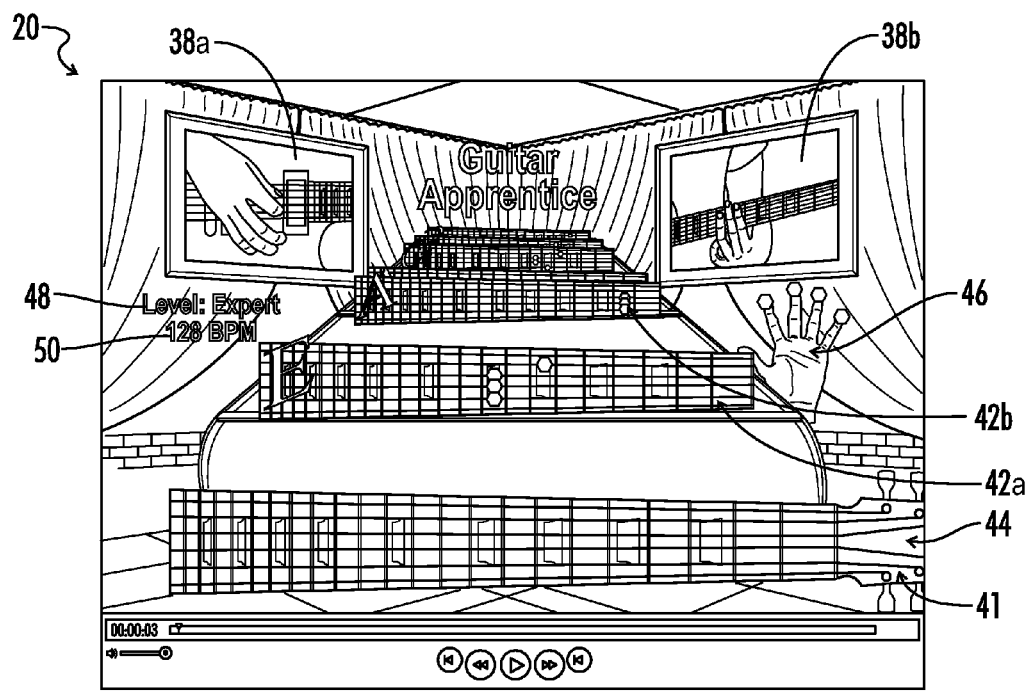

Referring to FIG. 9, a fret board diagram 42a is provided which demonstrates a first chord (E) of the musical performance. The diagrams 42 in various embodiments may not be merely static but instead approaching from above the stationary neck 41 below. A second diagram 42b in the example shown demonstrates a second chord (H) and approaches behind the second diagram 42b. Further provided in embodiments such as shown are visual indicators such as a color-coded hand/finger legend 46 corresponding to the colors in the fret board diagrams 42, a level setting 48 (e.g., expert) and a tempo setting 50 (e.g., 120 BPM).

Figure 10:
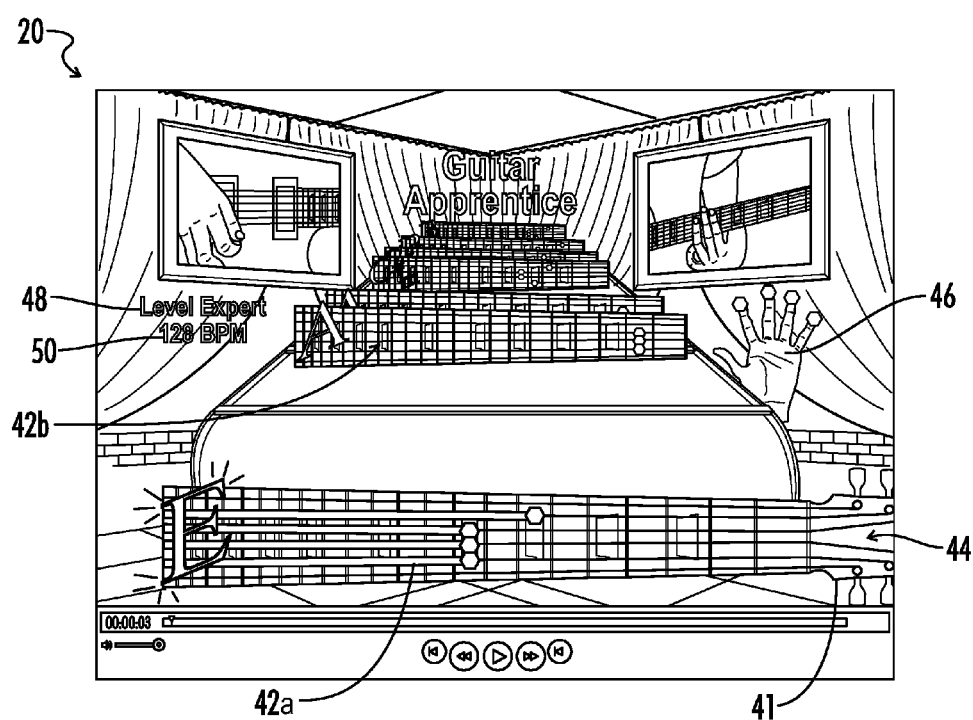

Referring to FIG. 10, the fret board diagram 42 reaches a highlighted region 44 at the exact moment where the user is supposed to play the "E chord." In the example shown, the highlighted region 44 is the fret board diagram 42a from FIG. 9 superimposed over or otherwise positioned with respect to the stationary neck 41 wherein strings associated with the "E chord" are highlighted in colors corresponding to the associated fingers in the hand/finger legend 46, and various additional features are highlighted to ensure that the user is aware the chord presented is supposed to be played at that time. The user can also see from the approaching diagram 42b that the next chord to play is an "A chord". It will arrive just in time and the stationary neck 41 will show it as the new chord.

Figure 11:
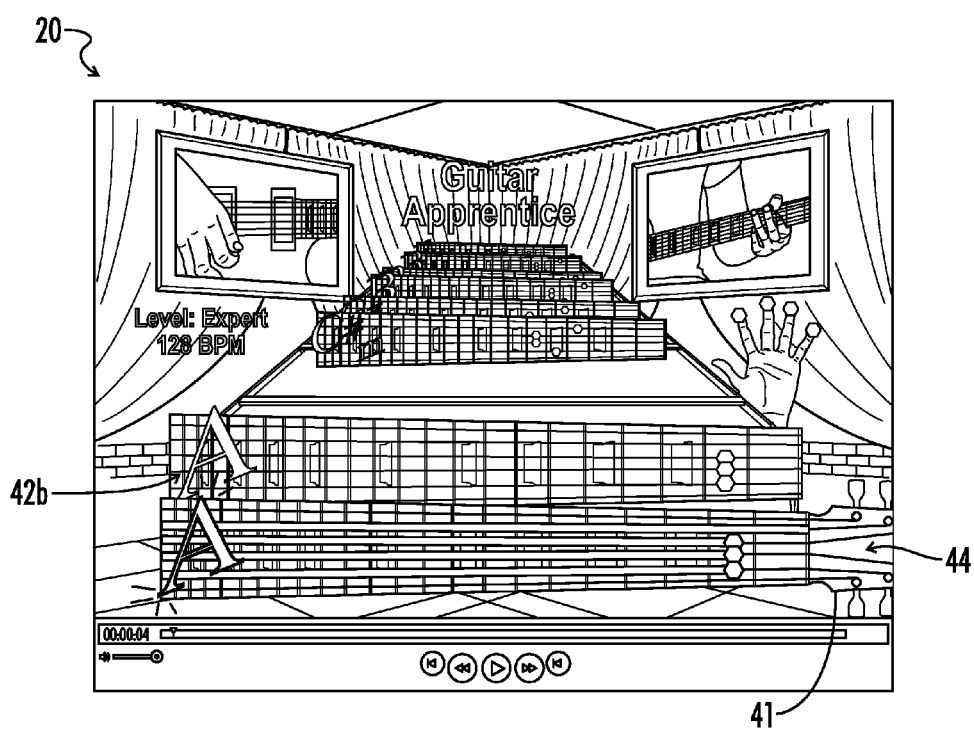

Referring now to FIG. 11, the diagram 42b representing the "A chord" has arrived in the highlighted region 44 in this embodiment associated with the stationary neck 41, and should be played by the user.

Figure 12:
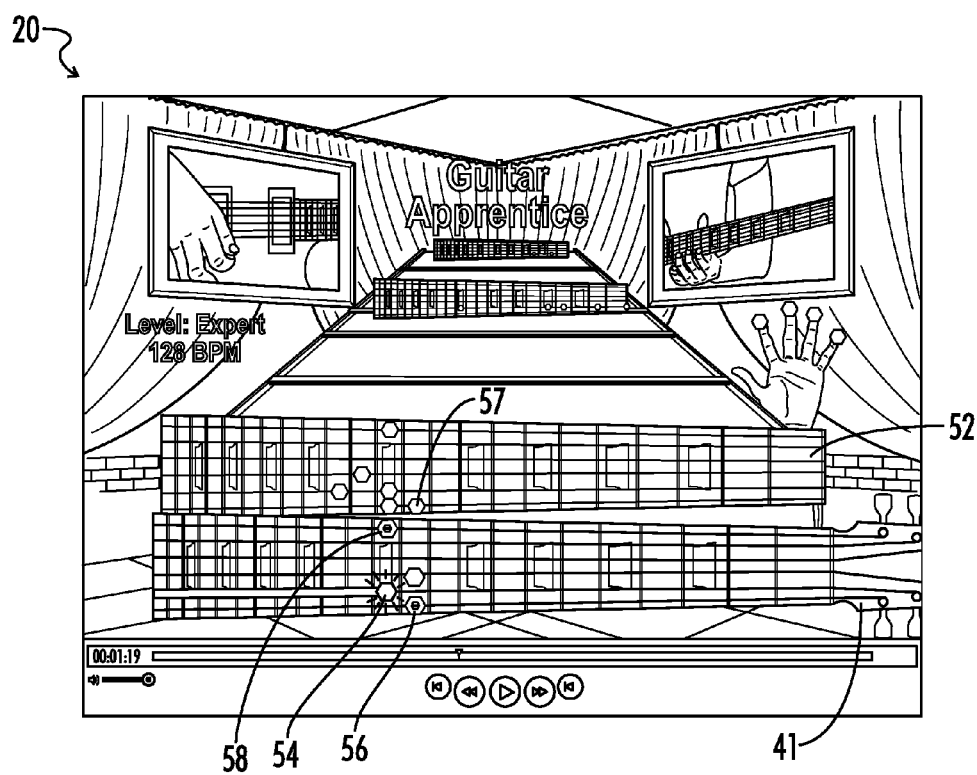

Referring to FIG. 12, the "solo" portion of the musical performance has arrived. All the notes in one measure of the solo are on an upper neck 52. A first colored note 54 (e.g., yellow) with the string lit is the note being played right now. The next note is indicated by (a) a hollow dot 56 having a second color (e.g., red) at the bottom neck 41, and (b) a solid dot 57 of the second color on the upper neck 52 sends out a duplicate that falls to arrive at the position of the hollow dot 56 on the neck below 41 just in time for it to be played. Notice that a hollow dot 58 of a third color (e.g., blue) has also materialized because it will be the third note to be played.

Figure 13:
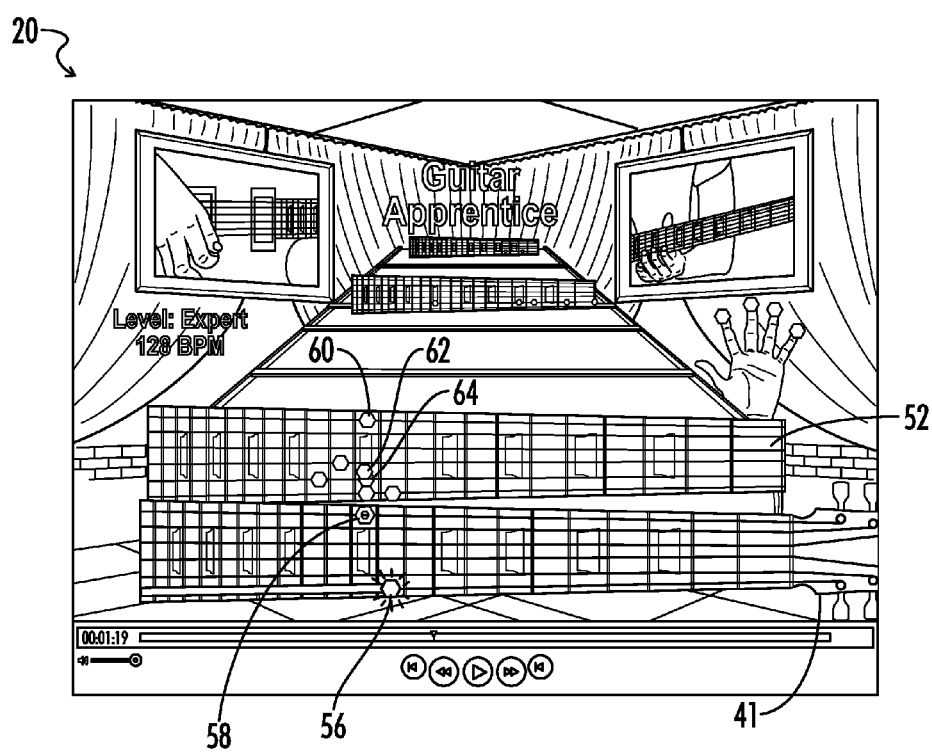

Referring to FIG. 13, the "red" note 56 below is now being played (e.g., is no longer hollow) and the "blue" hollow dot 58 is the next to be played. Notice a dot 60 of the third color (e.g., blue) that has begun to travel down from the neck above 52 (the "blue" dot 62 touching the dot 64 is actually representative of the dot 60 in motion toward the position of the hollow "blue" dot 58 on the lower neck 41).

Figure 14:
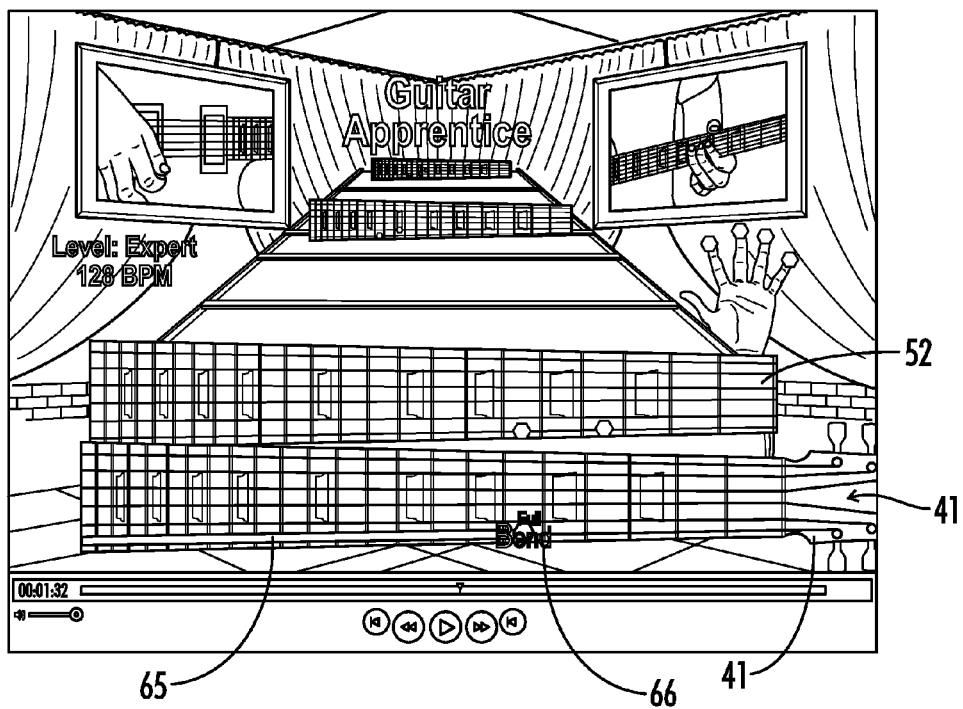
Figure 15:
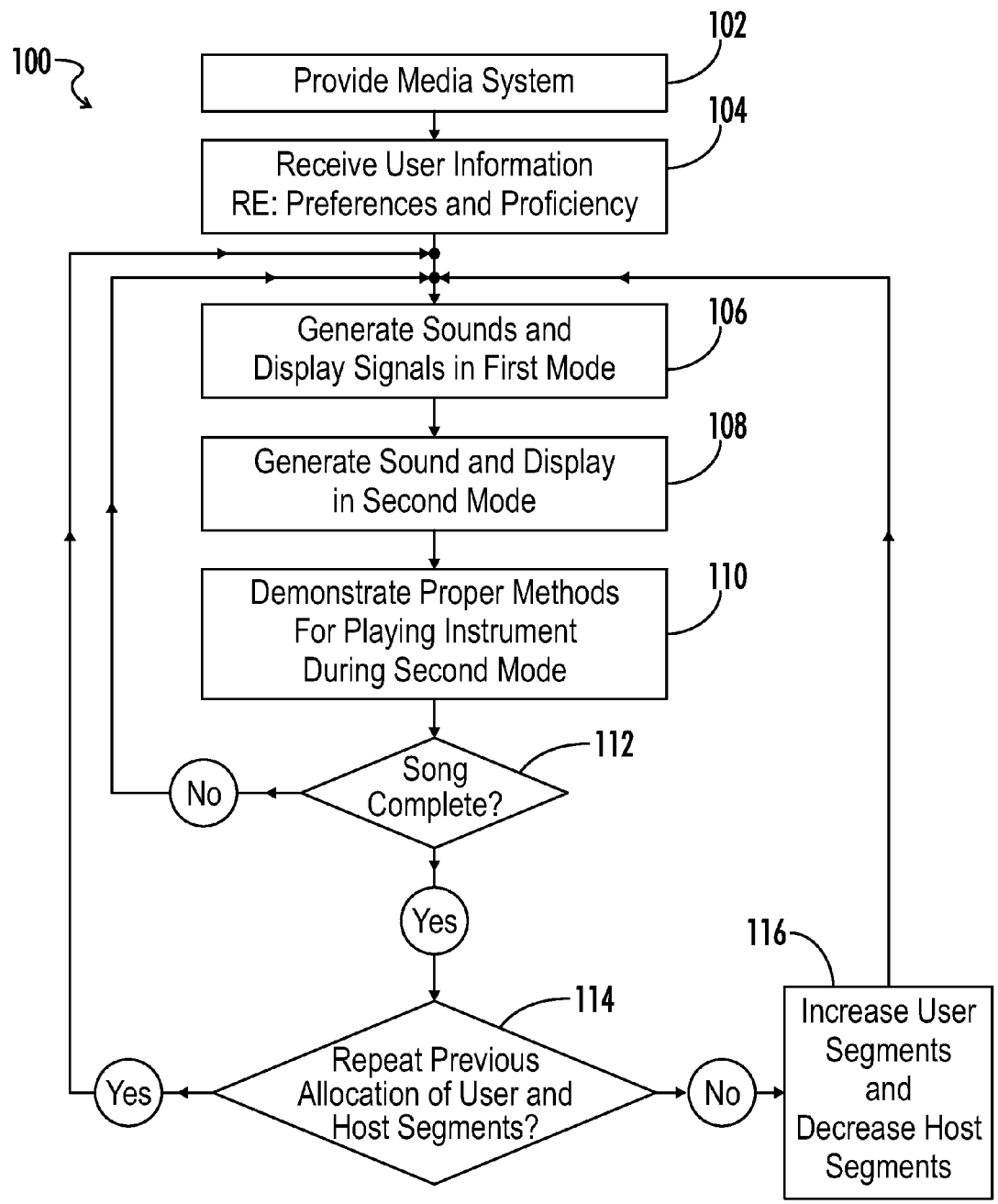
FIG. 15 is a flowchart showing an embodiment of a method of operation associated with various media systems as disclosed herein.

Referring now to FIG. 14, text 66 may be provided to further demonstrate proper technique. In the example shown, notice that the colored note 65 has the notation "Full Bend" 66 to indicate that the user is to bend the string one full step higher in pitch.

While various embodiments as described with respect to FIGS. 8-14 above use dots of various colors to indicate the proper notes or chords to be played, it may be understood that alternative embodiments may be provided using other devices, images, shapes, colors, etc., to instruct the user. Further, equivalent dynamic images may be provided with respect to various alternative musical instruments other than a guitar, as may be reasonably understood by one of skill in the art.

An embodiment of a progressive method of operation 100 for media systems in accordance with the present disclosure may be further described herein with respect to FIG. 11. Rather than requiring the user to learn all of the segments (e.g., notes and chords) of a musical performance before being able to play it all the way through, the performance may instead be presented in increasingly lengthy and/or difficult iterations. At an initial iteration, or otherwise stated at a lowest level of proficiency, the user may play only a minimal number of notes or chords out of all the notes or chords normally required to complete the performance. The remaining notes may be played by the media or gaming system 10 such that, by combining what the student plays and what the system 10 plays, the entire musical performance is heard and experienced by the user. On a successive iteration, the system may adjust the number of segments, such that the system plays fewer and the user plays more of the musical performance, and wherein in accordance with a final set or maximum proficiency level the user is playing all of the segments.

A media system 10 may be provided (step 102) in accordance with various embodiments such as for example described above and/or with reference to one or more of FIGS. 1-10.

To begin a session, the system 10 may first receive and process (step 104) information provided by a user. In various embodiments, the information received may include one or more of various available parameters including without limitation a selected musical performance, a selected musical instrument from among one or more instruments associated with the performance, a selected proficiency level and/or a selected musical segment.

Alternatively, the system 10 may omit this step where for example the proficiency level is to be determined by the system rather than provided by the user, the musical segments are predetermined in accordance with the determined proficiency level, only one musical performance is available, only one instrument is available, etc. It is anticipated, for example, that various embodiments of the system 10 may individually include separate performances or separate instruments rather than storing sets for all instruments associated with a song on the same memory medium or storing a plurality of songs on the same medium. In this manner various memory media for example may be provided separately while individually compatible with the same processor.

The method 100 continues in step 106 by generating a first set of audiovisual signals (or alternatively audio signals and separate but corresponding display signals) effective to simulate the musical instrument for the musical performance during the one or more host segments for a particular set of segments. The generating of signals during the host segments may further define a first mode of operation for the system, whereby the sounds produced by the selected instrument during the relevant portions of the musical performance are simulated by the system for the benefit of the user. In various embodiments the system may further generate signals associated with the sounds produced by each instrument associated with the song or musical performance during the first mode.

When the musical performance approaches a user segment, the method continues in step 108 by adjusting the first set of audiovisual signals to mute the predetermined instrument during the user segments (assuming there are user segments associated with the particular set) of the performance. The adjustment made during the user segment to the signals generated during the host segment, or alternatively the generating of a new set of signals in accordance with the desired result, may further define a second mode of operation for the system. In various embodiments where sounds from each instrument of the performance is simulated by the system during the host segments, the system may generally mute only the instrument being played by the user during the user segments, and continue producing sounds associated with the remainder of the instruments if applicable.

The system as presented herein may therefore be described for exemplary purposes as including a mode control software module 22d effective to designate an operating mode with respect to predetermined segments of the musical performance, such that generally host segments are associated with a first mode of operation and user segments are associated with a second mode of operation.

Where the first set of audiovisual signals include real-time images 38 as further described above in addition to the sounds associated with the performance, the images 38 themselves in various embodiments may continue without adjustment during both of the first and second modes of operation.

As described above, the "first" set of signals may define a series of signals which produce sounds simulating the musical performance and various real-time images corresponding to the performance, in both of the first and second modes of operation. It may be understood that adjustment during the second mode to the signals provided in association with the host segments (e.g., the first mode) may substantially result in another set of signals altogether, the signals are collectively defined herein as a first set with respect to a "second" set of signals relating more directly to musical instruction in step 110 below, and without intending to unduly limit the scope of the present disclosure.

The method 100 continues in step 110 by generating a second set of audiovisual signals associated with demonstration of a preferred user operation of the instrument.

In certain embodiments as previously described the second set of signals could provide graphical representations of the instrument with indicators for how the instrument is to be played in association with the first set of signals and during the second mode of operation. Where the graphical representations include animated musical notation, the appearance of various images of the instrument in a highlighted region may generally correspond to the second mode of operation, whereby the user is prompted to play the instrument as so instructed.

In alternative embodiments, the second set of signals could include audible instructions or warnings such as for example an alarm to indicate that the user should be prepared to begin playing, or additional visual imagery such as flashes or the equivalent to further highlight the instruction.

When the first mode and second mode of operation have both run through the associated series of segments, the method 100 continues in step 112 by determining whether the musical performance has completed or not. It may be understood that there may be various user segments within the context of a single musical performance, and further that user segments may in fact be the first segments in the musical performance, in either case meaning that additional segments in the musical performance remain after completion by the user of the first group of one or more user segments.

If the musical performance is not complete, the method 100 returns to step 106 and repeats the steps by continuing from the next segment.

If the musical performance has completed, the method 100 continues to step 114 and determines whether the next iteration of the musical performance will maintain the same allocation of segments between the host and the user. In various embodiments the system 10 may automatically adjust the segments in successive iterations, may receive input from the user as to whether or not the segments are to be maintained or adjusted, or may determine whether adjustment of the segments is warranted based on the detected or user-provided proficiency level of the user in comparison with the difficulty level of the segments.

Where the system determines, or responds to user input requiring, that the segments are to be maintained, the method 100 returns to step 106 and repeats the previous iteration of the musical performance with the same segment allocation, or otherwise stated maintains the previous set 32 of segments 30 having the same proportion of user segments 36 and host segments 34.

In various embodiments, where an adjustment to the segments is determined, the method 100 continues to step 116 where the system adds one or more segments of the musical performance to the one or more user segments and removes the segments added to the user segments from the one or more host segments. The method then returns to step 106 to continue with the musical performance in light of the adjusted segment allocation.

The number of segments to be adjusted (e.g., added to the user segments in successive iterations and removed from the host segments in the same iterations) may be determined in step 116 in accordance with predetermined sets of segments as stored in the system and as described above. Alternatively, the number of segments adjusted may be determined by the system in step 116 using predetermined criteria also as further described above.

The previous detailed description has been provided for the purposes of illustration and description. Thus, although there have been described particular embodiments of the present invention of a new and useful "Media System and Method of Progressive Musical Instruction," it is not intended that such references be construed as limitations upon the scope of this invention except as set forth in the following claims.

What is claimed is:

1. A system for progressive musical instruction comprising:
    a processor-readable memory medium having software residing thereon, the software executable by a processor to direct the performance of
        generating audio signals corresponding to a predetermined musical performance, the audio signals in a first operating mode including prerecorded sounds from each of one or more musical instruments associated with the musical performance, the audio signals in a second operating mode including sounds from said instruments with the exception of a predetermined musical instrument;
        generating display signals corresponding to the musical performance, the display signals arranged to provide musical instruction to a user relating to playing of the predetermined musical instrument during at least the second operating mode; and
        in association with successive iterations of the musical performance, incrementing a duration of the second mode and decrementing a duration of the first mode.

2. The system of claim 1, the predetermined musical instrument selectable by the user from among a plurality of musical instruments associated with the musical performance.

3. The system of claim 1, the predetermined musical performance selectable by the user from among a plurality of musical performances associated with the memory media.

4. The system of claim 1, the predetermined musical performance comprising a plurality of predetermined segments, wherein the software is further executable by the processor to determine an operating mode for each of the segments in a particular iteration of the performance based on predetermined criteria.

5. The system of claim 4, the criteria comprising one or more of a difficulty level of the segment, a proficiency level of the user, a distinctiveness rating for the segment, and a type of musical instrument.

6. The system of claim 5, wherein the proficiency level of the user is user-selectable.

7. The system of claim 5, wherein the proficiency level of the user is determinable by the system in accordance with signals received from an instrument played by the user during a previous iteration of the performance.

8. The system of claim 4, wherein an operating mode for one or more of the segments in a particular iteration of the performance is user-selectable.

9. The system of claim 4, wherein the durations of the first and second operating modes in a particular iteration are user selectable.

10. The system of claim 1, wherein generating display signals arranged to provide musical instruction to a user relating to playing of the predetermined musical instrument during at least the second operating mode further comprises:
    generating a visual representation of the instrument and graphically populating the visual representation with instruction tools associated with the instrument and in accordance with the musical performance.

11. A system for progressive musical instruction comprising:
    a display device;
    a processor operatively coupled to the display device; and
    a processor-readable memory medium having program modules embodied thereon, said program modules executable by the processor and further comprising
        a storage module effective to store one or more musical performances, each performance further comprising a plurality of musical segments;
        an audio control module effective to generate sounds in accordance with a selected musical performance, the generated sounds in a first mode corresponding to those produced by each musical instrument associated with the performance, the generated sounds in a second mode corresponding to the associated instruments except for a predetermined musical instrument;
        a display control module effective to generate upon the display device a visual representation of the predetermined instrument and graphically populate the visual representation with instruction tools associated with the instrument and in accordance with the musical performance; and a mode control module effective to determine the number of segments in the selected performance to be associated with each mode, wherein the number of segments associated with the first mode and the number of segments associated with the second mode collectively include all of the segments associated with the performance, the determination further based upon one or more criteria including a performance iteration, wherein in successive iterations the amount of segments associated with the first mode decreases and the amount of segments associated with the second mode increases.

12. The system of claim 11, wherein the criteria further comprise one or more of a difficulty level of the segment, a proficiency level of the user, a distinctiveness rating for the segment, and a type of musical instrument.

13. The system of claim 12, wherein the proficiency level of the user is user-selectable.

14. The system of claim 12, further comprising an electronic coupling between the system and the predetermined musical instrument, the program modules further comprising a proficiency sensing module effective to receive signals from the musical instrument played by the user, compare the received signals to expected signals associated with the relevant performance, and determine the proficiency level of the user based on the comparison.

15. A method of progressive musical instruction comprising the steps of:

(a) providing a media system having one or more processor-executable program modules and storing one or more predetermined musical performances each further comprising a plurality of segments;

(b) generating a first set of audiovisual signals effective to simulate a predetermined musical instrument associated with a selected musical performance from the one or more predetermined performances stored in the media system during one or more host segments of the performance;

(c) adjusting the first set of audiovisual signals to mute the predetermined instrument during user segments further comprising the one or more non-host segments of the performance;

(d) generating a second set of audiovisual signals associated with demonstration of a preferred user operation of the instrument;

(e) determining whether to maintain or increase the number of user segments for a successive iteration of the performance;

(f1) in accordance with a first determination, maintaining the number of user and host segments and repeating steps (b) to (e); and (f2) in accordance with a second determination, adding one or more segments of the musical performance to the one or more user segments, removing said segments added to the user segments from the one or more host segments, and repeating steps (b) to (e).

16. The method of claim 15, the predetermined instrument selectable by the user from one or more musical instruments associated with the selected musical performance.

17. The method of claim 16, wherein user segments are initially selectable from among the total segments of the performance.

18. The method of claim 17, wherein host segments are initially determined from among the total segments of the performance in accordance with criteria further comprising the predetermined instrument, the proficiency level of the user, the difficulty level of the segments, and distinctiveness of the segments.

* * * * *